(12) United States Patent
Bauer et al.

(10) Patent No.: US 10,625,251 B2
(45) Date of Patent: Apr. 21, 2020

(54) MULTISTAGE BODY HAVING A PLURALITY OF FLOW CHANNELS

(71) Applicant: EXENTIS TECHNOLOGY AG, Cham (CH)

(72) Inventors: Hans-Jörg Bauer, Wirges (DE); Elke Bauer, Wirges (DE)

(73) Assignee: Exentis Knowledge GmbH, Stetten (CH)

( * ) Notice: Subject to any disclaimer, the term of this patent is extended or adjusted under 35 U.S.C. 154(b) by 244 days.

(21) Appl. No.: 15/575,571

(22) PCT Filed: May 23, 2016

(86) PCT No.: PCT/IB2016/053006
§ 371 (c)(1),
(2) Date: Nov. 20, 2017

(87) PCT Pub. No.: WO2016/189447
PCT Pub. Date: Dec. 1, 2016

(65) Prior Publication Data
US 2018/0126369 A1 May 10, 2018

(30) Foreign Application Priority Data

May 22, 2015 (CH) ...................................... 0719/15

(51) Int. Cl.
*F01N 3/28* (2006.01)
*B01J 37/02* (2006.01)
(Continued)

(52) U.S. Cl.
CPC ........... *B01J 37/0201* (2013.01); *B01J 21/08* (2013.01); *B01J 21/18* (2013.01); *B01J 23/10* (2013.01);
(Continued)

(58) Field of Classification Search
CPC ...... F01N 3/022; F01N 3/0228; F01N 3/2803; F01N 3/2828; F01N 330/20; F01N 2330/00; F28F 7/02
(Continued)

(56) References Cited

U.S. PATENT DOCUMENTS 4,902,216 A * 2/1990 Cunningham .......... B28B 3/269
425/463
5,487,863 A * 1/1996 Cunningham .......... B28B 3/269
264/177.11
(Continued)

FOREIGN PATENT DOCUMENTS

DE 39 04 550 A1 8/1990
DE 198 30 342 C1 11/1999
(Continued)

OTHER PUBLICATIONS

International Search Report for PCT Serial No. PCT/IB2016/053006 dated Oct. 26, 2016.
(Continued)

*Primary Examiner* — Tom P Duong
(74) *Attorney, Agent, or Firm* — McCormick, Paulding & Huber PLLC

(57) ABSTRACT

Described is a new multilevel article comprising a multitude of ducts and, in each duct in the direction of flow, at least one area which generates turbulence, forms an open duct section, is connected to the duct wall, and forms a baffle for the incoming flow and a stall strip for the outgoing flow. The described article has a plurality of successive interconnected duct structures which form a step-like transition in relation to each other in the direct of flow.

18 Claims, 2 Drawing Sheets

(51) Int. Cl.
*B01J 37/08* (2006.01)
*B01J 21/08* (2006.01)
*B01J 21/18* (2006.01)
*B01J 23/10* (2006.01)
*B01J 35/02* (2006.01)
*B01J 35/04* (2006.01)
*F28F 7/02* (2006.01)
*F24S 10/80* (2018.01)
*F01N 3/022* (2006.01)

(52) U.S. Cl.
CPC .......... *B01J 35/023* (2013.01); *B01J 35/026* (2013.01); *B01J 35/04* (2013.01); *B01J 37/088* (2013.01); *F01N 3/022* (2013.01); *F01N 3/0228* (2013.01); *F01N 3/2803* (2013.01); *F01N 3/2828* (2013.01); *F24S 10/80* (2018.05); *F28F 7/02* (2013.01); *F01N 2330/00* (2013.01); *F01N 2330/02* (2013.01); *F01N 2330/20* (2013.01); *Y02E 10/44* (2013.01); *Y02T 10/20* (2013.01)

(58) Field of Classification Search
USPC ............ 422/177, 180; 55/523; 29/890
See application file for complete search history.

(56) References Cited

U.S. PATENT DOCUMENTS

| | | | | |
|---|---|---|---|---|
| 5,618,501 | A * | 4/1997 | Wieres | B01J 35/04 422/180 |
| 7,574,796 | B2 * | 8/2009 | Alward | B01D 39/2086 29/890 |
| 9,540,977 | B2 * | 1/2017 | Sadaoka | F01N 3/0222 |
| 2006/0191248 | A1 * | 8/2006 | Bardhan | B01D 39/2093 55/523 |
| 2008/0044621 | A1 * | 2/2008 | Strauss | B22F 3/1112 428/108 |
| 2009/0041635 | A1 * | 2/2009 | Berkey | B01D 46/2455 422/177 |
| 2011/0306088 | A1 * | 12/2011 | Chen | C04B 38/0009 435/41 |
| 2012/0061379 | A1 * | 3/2012 | Vempati Venkata | F24H 3/0405 219/553 |
| 2013/0259774 | A1 * | 10/2013 | Narushima | B01J 10/00 422/607 |
| 2014/0154146 | A1 * | 6/2014 | Aoki | B01J 35/0006 422/180 |
| 2018/0280961 | A1 * | 10/2018 | Aoki | B01D 46/2429 |

FOREIGN PATENT DOCUMENTS

| | | |
|---|---|---|
| DE | 20 2006 007 876 U1 | 10/2007 |
| DE | 10 2007 018239 A1 | 10/2008 |
| EP | 0 191 982 A1 | 8/1986 |
| EP | 0 250 166 A2 | 12/1987 |
| EP | 1 368 171 B1 | 12/2006 |
| JP | S49-1548 U | 1/1974 |

OTHER PUBLICATIONS

Written Opinion for PCT Serial No. PCT/IB2016/053006 dated Oct. 26, 2016.

* cited by examiner

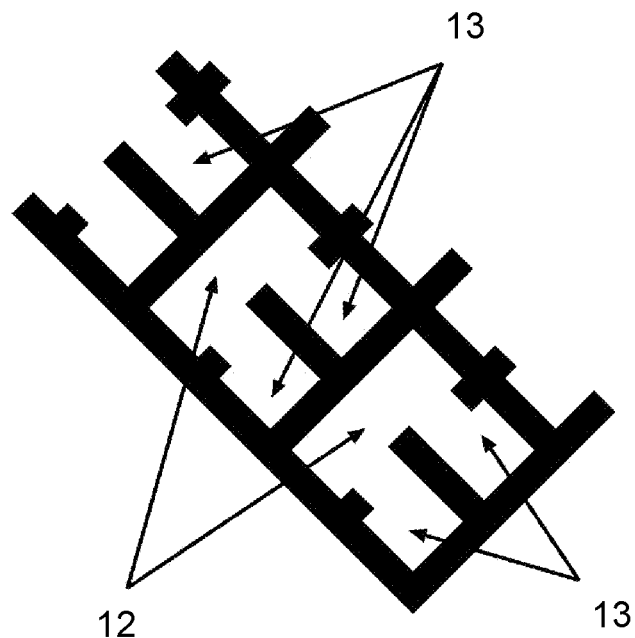

Fig. 3

| Einsatz | Material | | | | | Kanalwand | | Beschichtung | |
|---|---|---|---|---|---|---|---|---|---|
| | Keramik | Metall | Glas | Kunststoff | Organika | dicht | porös | direkt | wash-coat |
| Katalysator | XXX | XXX | XXX | XX0 | X00 | XXX | XXX | XXX | XXX |
| Filter | XXX | XXX | XX0 | X00 | X00 | X00 | XXX | XXX | XXX |
| Kombifilter | XXX | XXX | XX0 | X00 | X00 | X00 | XX0 | XXX | XXX |
| Absorber | XXX | XXX | XX0 | X00 | X00 | XX0 | XXX | XX0 | X00 |
| Wärmetauscher | XXX | XXX | XX0 | X00 | X00 | XXX | 000 | 000 | 000 |
| Chemiereaktor | XXX | XXX | XXX | XXX | X00 | XXX | XX0 | XXX | XXX |
| Chromatographie | XXX | XXX | XXX | XX0 | X00 | XXX | XX0 | XXX | XXX |
| Medizinprodukt | XXX | XXX | XXX | XXX | XX0 | XXX | XXX | XXX | XXX |
| Implantat | XXX | XXX | XXX | XXX | XX0 | XXX | XXX | XXX | XXX |
| Med. Wäscher | XXX | XXX | XXX | XX0 | X00 | XX0 | XXX | XXX | XX0 |

Fig. 4

MULTISTAGE BODY HAVING A PLURALITY OF FLOW CHANNELS

CROSS-REFERENCE TO RELATED APPLICATIONS

This application is a National Stage application of International Patent Application No. PCT/IB2016/053006, filed on May 23, 2016, which claims priority to Swiss Patent Application No. CH00719/15, filed on May 22, 2015, each of which is hereby incorporated by reference in its entirety.

TECHNICAL FIELD

The invention relates to a multistage body.

BACKGROUND

The development of catalytic converters and soot particle filters has induced an array of geometrical channel structures, which are essentially produced by means of extrusion methods and have a monolithic structure. These bodies, which are usually ceramic, have a channel shape over their length and promote laminar flows, which has a disadvantageous effect on the wall contact of the exhaust gas flows to be purified. In contrast, there are the wound catalyst supports made of ceramic or metal film, which can have stamped and bent wall segments, but in total have a monolithic structure and above all only offer a small wall surface area for accommodating the catalyst substance. Monolithic bodies which are mechanically connected to one another via the catalyst or filter housing, for example, in combination bodies having different catalysts, are also known, which are usually held more or less stably at their position by the packing pressure in the catalyst or filter housing via a thermally swelling insulation layer.

While these systems usually have a binder layer, which absorbs the catalyst, by means of wash coat methods, direct coating of the ceramic monolithic channels with catalyst is also known and is prior art. In this case, the coating itself is not the subject matter here and can be inferred from the published prior art.

SUMMARY OF THE INVENTION

The object of the invention is the development of a new generation of catalyst supports and filters having flow behavior which is optimized in relation to the prior art, of the media conducted through the carrier, additionally optimized in the flow media counter pressure and in the flow media temperature, optionally can be embodied both in ceramic and also in metal, glass, plastic, or in composites, each suitable for direct coating with catalyst and/or by means of an intermediate layer in the form of a so-called wash coat.

This object is achieved by a multistage body for catalysts having the features of a multistage body having a plurality of flow channels wherein each individual flow channel of the plurality of flow channels, in the flow direction in each individual flow channel, has at least one turbulence-generating surface, which forms a non-closed sub-channel and is attached to the channel wall, and which forms a baffle surface at flow entry and a separation edge for the flow at flow exit, and wherein the multistage body has multiple channel structures, which are connected in succession and form a stepped transition in relation to one another in the flow direction, wherein the baffle surface and the separation edge are arranged so that they occupy no more than 75% of the cross section of the individual flow channel.

According to the invention, the achievement of the object represents the optimization of the wall contacts of the media volume flow in catalytic converters and filters, above all in the case of applications in hot gas operation such as with internal combustion engine exhaust gases, such that it can be not only a singular structural optimization in the form of wall thickness deviations, geometrical channel shapes such as square, rectangle, round, or hexagonal, but rather it requires a multifunctional structural optimization, which takes into consideration the aspects of the turbulences in the flow inside a media flow channel, the suppression of laminar routes and flow blockages linked thereto, the pressure differences linked thereto between entry and exit of the media volume flow from the body, also referred to as pressure loss, the maximization of the wall contact rate of the media volume flow, and the differences of volume flow, media speed, and differential temperatures over the carrier cross section, and solves them with respect to design.

With the development of generative manufacturing methods, new design degrees of freedom have arisen, which result, via stereolithography, filament printers, powder bed printers, and selective laser sintering and melting methods for prototypes and small piece counts up to three-dimensional screen printing for mass production, in novel optimizations of the channel geometries.

In the overall consideration of individual flow channels inside a catalyst support, it has been shown that in the case of conventional monolithic structures, turbulent regions can occur solely in the first entry phase of the exhaust gas volume flow, which only act a few millimeters in the channel depth, however. Adjoining thereon, up to the exit of the exhaust gas volume flow, the flow is substantially laminar and is only slightly disturbed on the channel wall in the immediate vicinity of the volume flow. If the wall is made fluidically rough here, so called flow blockages occur above all at elevated temperature; as a result thereof, the clear channel widths have to be selected as large, which results in significantly reduced channel wall surface areas. The exhaust gas volume flow, once it has entered the channel, also can no longer change. This is disadvantageous above all in the case of non-uniform distribution of the exhaust gas volume flow before the entry into the body, since in one case this results in underloading of the channel in the event of low volume flow component, and therefore the catalytic activity can only be partially utilized, in the other case, with large volume flow component, an overload of the channel occurs, and therefore a risk occurs of the exit of non-purified exhaust gases and possibly even flow blockages, whereby the catalytic activity of this channel approaches zero.

These deficits were able to be taken into consideration according to the invention by a completely novel type of structure of the catalyst or filter body, which, after coating using a catalytic substance in each case in the individual channel and in the body, improves the parameters of the turbulent component of exhaust gas volume flow, increased wall contact of the exhaust gas volume flow, balancing of the volume flow over the body cross section, balancing of the temperature profile over the body cross section, minimization of the risk of flow blockage, reduction of the risk of regional overheating, and finally enables a reduction of the body dimensions by way of higher activity. The novel design offers the option of changing the external component geometry, since the length can be increased due to the lower exhaust gas counter pressure with reduced body cross section, without a performance loss occurring. Therefore, the dwell time of the exhaust gas volume flow in the catalytically active body component can be significantly lengthened, without causing the reduction of the volume flow or increasing the counter pressure. The novel design enables, in addition to a variety of individual channel geometries, of the square, rectangle, hexagon, ellipse, or circle, the use of dense materials, porous materials, ceramics, metals, glasses, plastics, and composites with free formation of the external geometry of the body, and also the combination of changing channel geometries in the transverse direction, the X and Y axes, and also in the longitudinal direction, the Z axis. It is novel in the design that the segments of the body are designed as functionally short in the Z direction, in order to suppress the formation of laminar flows.

BRIEF DESCRIPTION OF THE DRAWINGS

Further advantages of the invention follow from the dependent patent claims and from the following description, in which the invention is explained in greater detail on the basis of an exemplary embodiment illustrated in the schematic drawings. In the figures:

FIG. 3 shows a top view of two flow channels divided in three, and FIG. 4 shows the material selection for possible fields of use.

DETAILED DESCRIPTION

In the figures, the same reference signs have been used for the same elements in each case and initial explanations relate to all figures, if not otherwise expressly noted.

In the following table, the most essential parameters of the novel body are shown by way of example in comparison to the prior art:

| function | in channel longitudinal direction | in a channel transverse direction | in body transverse axis | in body longitudinal axis |
| --- | --- | --- | --- | --- |
| flow type | turbulent | turbulent | turbulent | turbulent |
| reactor surface | high | high | high | high |
| catalytic activity | high | high | high | high |
| flow directions | X, Y-Z | X, Y-Z | X-Y | Z |
| volume flow in the channel | various | various | ./. | ./. |
| volume flow in the body | ./. | ./. | distributed | distributed |
| pressure loss | low | ./. | ./. | low |
| temperature distribution | homogeneous | homogeneous | homogeneous | homogeneous |
| pressure surge sensitivity | low | low | low | low |
| risk of overheating | low | low | low | low |
| risk of undercooling | low | low | low | low |
| flow blockages | low | low | low | low |
| mechanical strength | high | high | high | high |

The foundation of the invention is also the finding that the volume flow entering a conventional channel only has turbulences a few millimeters in the Z direction, which are large enough to induce intimate wall contact and thorough mixing after the entry phase, and assumes a more laminar character already after this short route in the Z axial direction and the possible catalytic activity continuously decreases over the longitudinal axis because of the increasingly laminar flow form.

Figure 1:
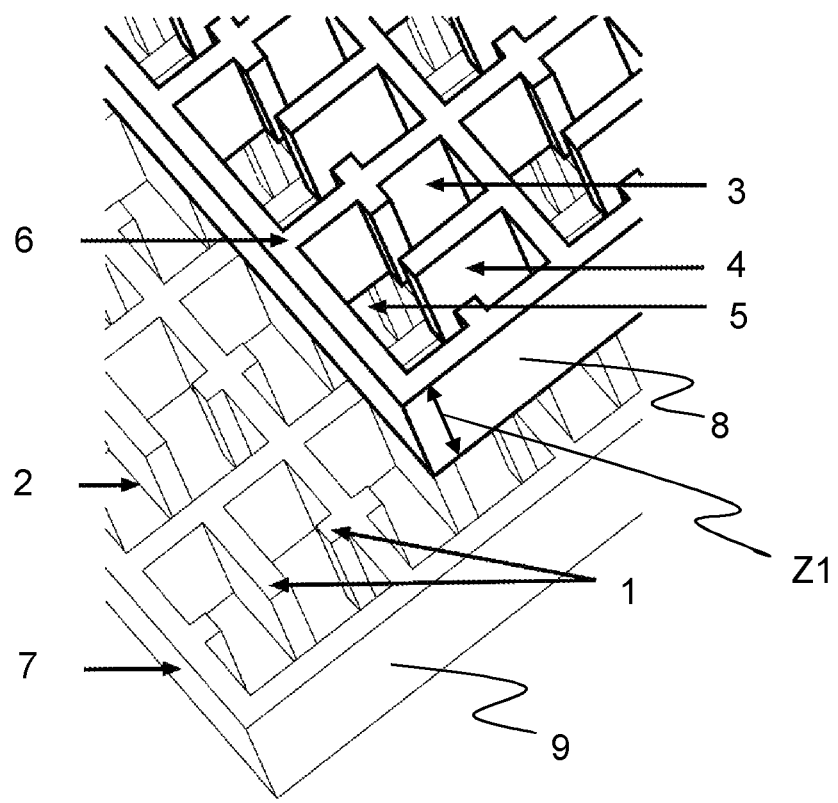
FIG. 1 shows two filter bodies arranged one over another.

The catalytic converter, filter body, or reactor body 8 and 9 in FIG. 1 has surfaces which result in turbulences in the flow direction, and which act as baffle surfaces 1 on the volume flow entry side and as flow separation edges 2 on the volume flow exit side. The baffle surfaces 1 and baffle edges 2 are arranged in this case so that they occupy no more than 75% of the cross section of the individual flow channel. Preferably but not exclusively, it has been shown in the case of more or less rectangular, square, or hexagonal individual flow channels or individual channels, but possibly also in the case of round or elliptical or freely formed individual channel geometries, that the baffle surfaces 1 and separation edges 2 are arranged such that fluidic subchannels 3, 4, and 5 are formed in the individual channel.

Figure 2:
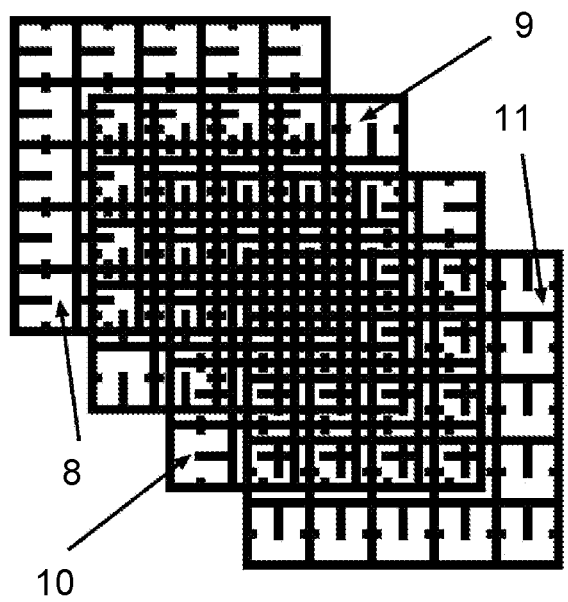
FIG. 2 shows four filter bodies in a top view, which are arranged offset in relation to one another.

In the simplest embodiment, an offset of two filter bodies 8 and 9 in FIG. 2 has the result that an individual channel already forms baffle surfaces 1 and separation edges 2 itself in the through flow direction after a partial distance Z1. This has the result that the catalytic converter, filter, or reactor body 20 changes its structure at least once in the volume flow direction, such that the structure change is induced in the simplest case by an offset of the channel structures in the through flow direction. On the basis of the example of the rectangular individual channel, from which the invention proceeds for channel shapes applicable to other than rectangular channel cross sections, the offset is induced by shifting the channel planes in each case, but not exclusively, by half the channel width in the X direction and in the Y direction. The offset is formed using the four filter bodies 8, 9, 10, and 11 in FIG. 2.

In the simplest case, this arrangement has the effect that the channel planes, in relation to the individual channel, are connected to one another by at least four spot areas in order to ensure the mechanical body strength and the temperature conductivity over the channel planes.

Surprisingly, it has been shown that with sufficiently small plane depth, a lasting turbulent flow can already be generated without the volume flow counter pressure rising significantly. In various experiments and simulations, it has been recognized that the activity of the generation of turbulent flows by means of baffle surfaces and separation edges, above all in the case of channel cross sections below 5 mm, does not act substantially deeper in the Z direction than 4 times the channel diameter. A structure change is provided in this case at 2.5 times the channel diameter in each case. The structure change is provided at least once inside a body, but at most less than X times the single channel diameter. Preferably, but not exclusively, it has been shown for the rectangular channel selected as an example having a clear channel width of 1.5 mm, that a structure change between 2.5 mm and 7.5 mm, preferably every 5 mm, has the highest turbulence-generating and turbulence-maintaining factor.

It was possible to find in the considerations that resulting volume flow division at the transition of the exhaust gas volume flow from one structure plane into the next structure plane has an advantageous effect on the catalytic action due to the resulting cross-flow. More extensive considerations have had the result that it is advantageous to form the turbulence-generating baffle surfaces 1 such that the individual channel is divided into multiple sub-channels 12 and 13 (see FIG. 3), which are directly connected to one another in the Z axial direction, however. In the example of the rectangular channel cross section, which is described but is not exclusive, a division of the flow channel into three parts, the sub-channels 12 and 13, was able to be achieved by means of two small embodied baffle surfaces 1, which protrude by approximately the wall thickness into the flow channel, and one baffle surface 1, which extends approximately halfway plus half of the wall thickness into the flow channel. Multiple effects which have a positive action on the catalytic activity and flow were able to be generated by this division embodied by way of example:

enlargement of the wall surface available for reactions per flow channel in the Z axial direction by baffle surfaces and separation edge surfaces enlargement of the wall surface available for reactions per flow channel in the X, Y axial direction by baffle surfaces and separation edge surfaces enlargement of the wall surface available for reactions per flow channel plane in the X, Y axial direction by channel outer wall surfaces not occupied by connecting spot areas increase of the number of connecting areas between the structure planes from four shown by way of example to eight connections shown by way of example with resulting structural stability improvement Other shapes, dimensions, arrangements, and numbers of the sub-channels 12 and 13 are also possible.

In the consideration of the exemplary example, the following dimensions result in the case of a clear channel width of 1.5 mm, a channel wall thickness of 0.25 mm, two baffle surface sizes of 0.25 mm×0.15 mm, a third baffle surface size of 0.25 mm×0.875 mm, with an element depth of 5 mm, in relation to a monolithic flow channel having 1.5 mm clear channel width:

conventional: reaction surface 30 mm$^2$
new example: inner wall surface 32.75 mm$^2$+baffle surface+ separation edge surface 3.25 mm$^2$
total reaction surface 36 mm$^2$ Therefore, an enlargement of the reaction surface by more than 20% is already implemented with the simple channel design, which can be further enlarged or reduced in size by design.

In the described example, a conventional 1.2 mm clear width channel is represented in the available reaction surface by the design having a 1.5 mm clear width channel. With the expanded clear widths in relation to the conventional monolithic prior art, the flow cross section is not restricted by the additively integrated baffle surfaces 1 and separation edges, so that above all due to the segmentation in the flow channels in the Z axial direction of the structure, laminar flows are prevented, simultaneously also the flow blockage formation, without a significant increase of the volume flow counter pressure being able to occur.

The concept according to the invention of generating turbulences takes into consideration the circumstance that in particular with restricted external installation size, as in a catalytic converter, a maximum of volume flow wall contact occurs with continuous mixing of the flow in all directions.

For the turbulent flow flux to generate a high wall contact rate of the exhaust gas volume flow, the wall filtration, the chemical preparation, for example, as a chromatography body for industrial or medical applications, at least four effects are available here:

One effect for generating turbulence is the incidence of the exhaust gas volume flow on the surfaces extending into the individual flow channel, which are referred to as baffle surfaces. The volume flow divides here with change of the flow direction in the X and Y axial directions while maintaining the main flow direction in the Z axial direction.

A further effect for generating turbulence is the exit of the exhaust gas volume flow from the lower edges of the baffle surfaces. Flow eddies arise here in the X and Y axial directions while maintaining the main flow direction in the Z axial direction.

A further effect for generating turbulence is, upon entry into a channel segment, the incidence of the volume flow on the channel wall not occupied by previous channels in the sense of a baffle surface with distribution of the volume flow into each four adjoining individual channels and the exit of the volume flow from the individual channel in the case of channel wall which is not occupied by subsequent channels in the sense of a separation edge with distribution of the volume flow into each four adjoining individual channels.

A further effect is the volume flow flowing behavior inside a segment of an individual channel. As sketched in the example according to FIG. 3, the individual channel is composed of two short baffle surfaces and one baffle surface extending over the channel center. Resulting therefrom, a threefold U-shaped inner channel structure is thus formed, having openings toward one another in each case. While in the two resulting smaller U-shaped channel segments 13, a volume flow development oriented toward the U bottom results, promoted by the open U shape side toward the channel part 12 having reducing flow speed, increased flow speed with wall development toward the U bottom of the segment 12 will result in the channel segment 12, which is also forced into a flow development due to the flow circulation from the two smaller channel segments. This circulation is significantly strengthened by the wall frictions due to the turbulence of the baffle surfaces and separation edges. However, before a laminar flow can result, the channel plane already changes with additional baffle surfaces due to the outer walls of the channels of the following plane, so that intimate thorough mixing of the entire volume flow occurs within the individual channel.

The above effects occur not only in the described example having rectangular individual channels, but rather can also be applied to other geometric formations of the channel shape.

Promoted by the turbulent flow in all individual channels and channel segments, overall volume flow is distributed at each transition into the following plane, above all in the X and Y axial directions of the body.

Further positive effects results therefrom even in the event of uneven distribution of the volume flow upon entry into the body:

The exhaust gas volume flow is distributed inside the body upon the transition from one structure plane to the following structure plane, wherein the distribution is distributed in the stages from the flow component from channel 1 of the first plane into channels 1, 2, 3, and 4 of the second plane. The volume flow from channel 1 is distributed further, after its distribution in the second plane, in the third plane onto the channels 1, 2, 3, 4, 5, 6, 7, 8, and 9. At the same time, the respective resulting volume flow components also enter the following channel plane from the adjacent cells of the first plane. Due to the channel openness forming by way of the planes and the offset of the channels in relation to one another, a volume flow balancing over the body cross sections thus occurs. Shortly after entry of the volume flow, the entire body cross section can already be used for a homogeneous volume flow preparation with uniform pressure and volume conditions at equal mean flow speed. A pressure increase in an individual channel can no longer result in a loss of purification, since the proportional volume flow can deviate to the following adjacent channels. The pressure loss over the body cross section is therefore distributed uniformly and conventionally participating body regions, above all the body edge regions and the center of the body, can no longer be overloaded or underloaded. As a result, the achievable efficiency increases in the multistage body 20.

The temperature is also homogenized in two ways over the body cross section using the illustrated volume flow division between the channel planes. One homogenization part is the supply of energy via the volume flow distribution due to the flow distribution over the body cross section, the second homogenization part is the distribution of the reaction heat arising due to reactions on the channel walls. Due to the balancing of the temperature profile over the body cross section, a deficit in the edge regions and an excess in the body middle can be substantially equalized, so that undercooling or overheating, respectively, can no longer necessarily occur to the extent as in the prior art.

Depending on the application requirements, in addition to the number of baffle surfaces and separation edges, the size and shape thereof can also be individually adapted and also embodied differently within an individual channel of a body plane and/or between the body planes. With respect to design, the rectangular channel shape and an offset by one half channel width in each of the X and Y axial directions is most advantageous, above all upon the use as a catalyst support, a lesser or greater offset, and/or a rotation with or without offset, can also possibly be technically advantageous in certain applications. The adaptation of the baffle surfaces and separation edges and the contact spot areas of the plane connections are to be equalized in their location, shape, and number to the plane structure. This is enabled in particular but not exclusively by the production of the of the body by means of generative manufacturing methods, in particular three-dimensional screen printing, followed by three-dimensional powder bed printing, selective laser sintering and laser melting, and filament printing, and further methods less suitable for mass production. To a limited extent, for model preparation without technical requirements for precision and durability, manual assembly of flat plates by means of classical joining techniques, such as adhesive bonding, decorating, screwing, clamping, soldering, or diffusion welding is feasible, but is economically and technically unsuitable for piece production or mass production.

The materials of the body for the selection of possible fields of use is shown in FIG. 4 and evaluated by means of three identifiers for the novel bodies. In this case, XXX is the identifier for unrestricted, XXO for mostly suitable, X00 for less suitable, and 000 for unsuitable. It is apparent that the list of the possible applications and suitabilities only includes an exemplary selection. Illustrated on the basis of the example of the implants which have, for example, antibiotics or cytostatic agents as a direct coating, or the wash coat in the form of collagen, it is suitable for representing vital cells as the catalyst for growth integration in the organism. The chromatography field is also to be listed here in its multi-functionality. It is also apparent that the listed filter is less suitable for wall passage filtration, but rather for surface filtration, unless the body geometry according to the invention is followed by a region having alternating closed channels and/or is provided before it.

The multistage body, preferably in the embodiment as a support for catalysts, can be produced from an array of materials. Above all ceramic, metal, glass, and plastic come into consideration in porous or dense material form for the technical applications. Plastics and organic materials, in contrast, are to be considered more for the novel bodies for use in the field of medical products and implants. It is also possible by way of the design according to the invention to change the material with each body plane, if this was not already done during the production of the planes. It has been shown that above all for the use as a catalyst support, the channel shape is best suitable for accommodating the catalytically active substance and providing it later for the catalytic reaction. Both the methods of direct coating, and also the coating by means of an intermediate carrier layer, the wash coat, are suitable coating methods here. This is also true of chemical reactors and the use as chromatography bodies, in which a defined reaction and flow rate control is enabled using the novel body. Especially for so-called biochromatography, blood preparation and purification, defined and complete conversion reactions, which are identical with respect to time, volume, pressure, and temperature, are of particular significance and are enabled reproducibly by the novel bodies, without having to make use of random body distributions, as in the case of chromatography body fill. It is also possible due to the body shape to recycle the body multiple times and/or to clean it after its use and dispose of it in unmixed form.

An exemplary embodiment of a body for use as a catalyst support is described hereafter by way of examples for the various areas of application and dimensions. From a provided material of a mixture made of cordierite and silicon carbide powder, admixed with an additive combination to form a screen printing compound, it is processed in three-dimensional screen printing. The layout of the first forming tool, the printing screen, includes an array of catalyst support arrangements having the designed first plane of the support and its external shape contains the inner support structure containing catalyst support channels. After the printing of the first support plane at a height selected as 5.0 mm here, the second forming tool, having the channel geometry offset by one half channel width in each of the X and Y axial directions and rotated by 90°, wherein the external geometry of the bodies of this printing plane is congruent with the first printing plane, is also printed up to a height of 5.0 mm. The third forming tool, the fourth forming tool, etc. follow on the resulting 10 mm printing height, until the total body height is reached. The printed body is subsequently separated and fired to the desired strength in a thermal sintering method.

At the same time, the release of the printing additives also takes place. In the present example, the fired catalyst support, which is embodied here using a porous material, is impregnated by means of vacuum assistance with a solution of rare earth elements, which have the catalytic effect in their composition. After the removal of the excess component of catalyst, it is bonded in a further thermal firing process to the composite composition of the support material made of cordierite and silicon carbide.

In the geometrical embodiment of the example, the catalyst support has an external diameter of 100 mm. The outer wall of the support, with a wall thickness of 0.5 mm, is embodied as reinforced in relation to the wall thicknesses of the channel structures. The channel structures consist in the described example of squares having an outer wall thickness of 0.25 mm and a clear channel width of 1.5 mm. While a baffle surface element/separation edge element is arranged centrally on one and on the opposing channel side walls, having a width of 0.25 mm and a depth extending into the channel of 0.15 mm, on one of the remaining channel walls, a baffle surface element/separation edge element is located having a width of 0.25 mm and a depth extending beyond the channel middle of 0.875 mm. The adjoining channels in the following plane of the body are then seated with their side walls on the middles of the side walls of the preceding channel and the middle of the long baffle surface element and are fixedly connected thereto by the subsequent sintering procedure. The individual channels thus formed have, in addition to the baffle surfaces 1 and separation edges 2, an internal channel structure having two small U-shaped and one broader opposing U-shaped sub-channel, wherein the U-shaped openings of the sub-channels each abut one another.

In one variant, the baffle surface elements and the separation edge elements are embodied somewhat broader than the following channel wall thickness, so that additional offset planes, which act to increase turbulence, are provided here in the overlap regions. In this case, this design form is intended more for slowly flowing gas flows, since the time factor is usually desirable there for the gas passage through the body in the Z axial direction.

The described example may now be applied by a person skilled in the art without problems to other applications, materials, external geometries, channel shapes, internal channel shapes, baffle surface shapes/separation edge shapes, and the number and dimensioning thereof, and to different body element heights, and also to the shape and application of a possible catalytic or reactive coating in the direct coating and/or wash coat method.

In a further exemplary example, an absorber body consisting of a silicon carbide compound, with corresponding sintering, is prepared, which has its use in obtaining solar energy, preferably here in the stationary solar tower power plants and the mobile dish power generators. In this special embodiment form, in the first body plane, the embodiment of the baffle surface elements and the separation edges is dimensioned larger than in the body for catalytic converters. For example, these are 0.3 mm width of the baffle surface elements with a depth also of 0.3 mm, wherein the third baffle surface component has a width of 0.25 mm and a depth of 1.25 mm. This dimensioning of the first body plane is suitable above all for absorbing the solar energy and is accordingly computed as thin, having a plane thickness of 3.5 mm, since the vertically incident solar radiation can hardly penetrate deeper into the structure. The body planes following the first body plane are used here for heat conduction from the first body plane and the transfer of the heat to the medium flowing through, which is usually air in the case of the tower power plants. After exit of the heated air from the absorber, it is used for conventional power generation by means of turbine technology, and/or for introduction into heat accumulators in the case of a surplus.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A multistage body having a plurality of flow channels, wherein each individual flow channel of the plurality of flow channels, in the flow direction in said individual flow channel, has at least one turbulence-generating surface, which forms a non-closed sub-channel and is attached to the channel wall, and which forms a baffle surface at flow entry and a separation edge for the flow at flow exit, and wherein the multistage body has multiple channel structures, which are connected in succession and form a stepped transition in relation to one another in the flow direction, wherein the baffle surface and the separation edge are arranged so that they occupy no more than 75% of the cross section of the individual flow channel.

2. The multistage body according to claim 1, wherein each individual flow channel is rectangular, square, or hexagonal and each individual channel structure has a plane depth between 2.5 mm and 7.5 mm, preferably 5 mm, in the flow direction.

3. The multistage body according to claim 1, wherein a side wall element protrudes as an additional baffle surface into the individual flow channel, which forms the baffle surface on the flow entry side and the separation edge on the exit side, and the baffle surfaces and separation edges are used to cause a turbulent flow.

4. The multistage body according to claim 3, wherein the baffle surfaces and separation edges divide the individual flow channel into more than one sub-channel, which are connected to one another and which each have an open side in relation to one another.

5. The multistage body according to claim 4, wherein sub-channels are formed in a flow channel, which have wall friction components of different levels, which are used to cause rolling of the flow over the side walls in the flow direction.

6. The multistage body according to claim 5, wherein the baffle surfaces and the separation edges divide the flow channel into at least three sub-channels open on one side, of which at least one sub-channel part has a larger through flow area than the at least two remaining sub-flow channels.

7. The multistage body according to claim 1, wherein the channel wall, as a catalyst support, is coated with a catalytically active substance of the rare earth elements directly and/or via an intermediate carrier.

8. The multistage body according to claim 1, wherein the channel wall, as a catalyst support, is coated with a catalytically active substance of the transition metals directly and/or via an intermediate carrier.

9. The multistage body according to claim 1, wherein the flow direction forming the body is divided into more than one plane, and each channel position of the following plane is arranged offset transversely to the flow direction in the X direction and in the Y direction and/or pivoted in relation to the channel position of the preceding plane.

10. The multistage body according to claim 9, wherein due to offset of the position of the following channels in relation to the preceding channels, additional baffle surfaces and separation edges are formed from the parts of the end faces of the channel side walls which are not occupied by side wall elements, baffle surfaces, or separation edges of the adjacent body planes.

11. The multistage body according to claim 10, wherein the individual flow channel in one body plane merges into two different individual channels of the following plane, to divide the volume flow.

12. The multistage body according to claim 11, wherein the individual channel connections are arranged such that a pressure distribution, a temperature distribution, and a volume flow distribution takes place over the body planes.

13. A production of the body according to claim 1 using a method of generative manufacturing, in particular using three-dimensional screen printing and/or using three-dimensional powder bed printing and/or using three-dimensional laser sintering and/or three-dimensional laser melting and/or filament printing.

14. The production of the body according to claim 13, wherein the body is produced from ceramic, glass, metal, plastic, organic materials, or composites.

15. A use of the body according to claim 1 in the automotive field as a catalyst support or as a filter or as a combination body.

16. A use of the body according to claim 1 in the energy field as an absorber or heat exchanger.

17. A use of the body according to claim 1 in the chemical field as a chemical reactor or chromatography body.

18. A use of the body according to claim 1 in the medical field as a growth framework or as an implant or as a washer.

* * * * *